Sept. 15, 1953     R. A. MATHEISEL     2,652,505
INVERSE ROTOR
Filed April 28, 1950
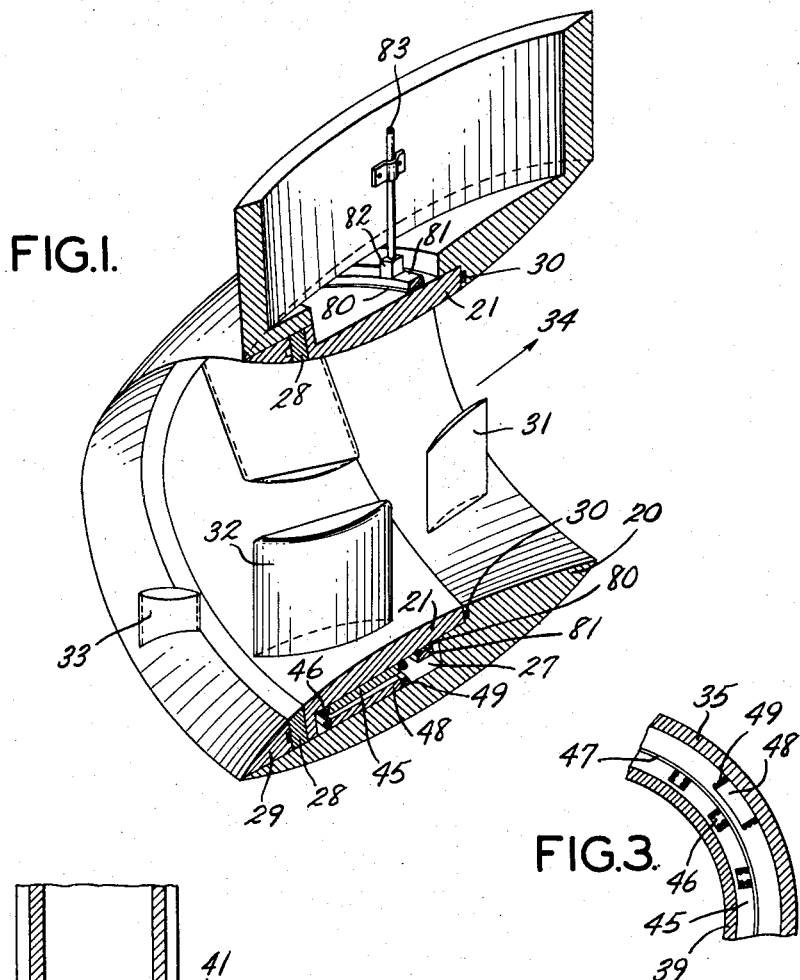
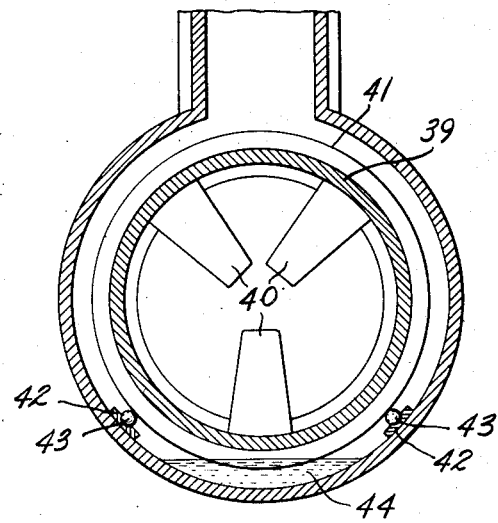
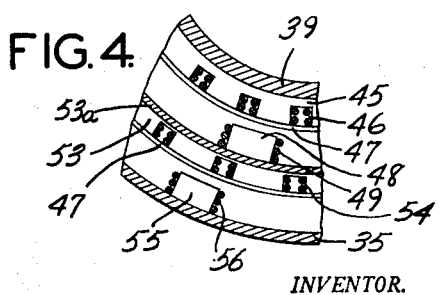
INVENTOR.
RUDOLPH A. MATHEISEL
BY
*Irving Seidman*
ATTORNEY.

Patented Sept. 15, 1953

2,652,505

UNITED STATES PATENT OFFICE 2,652,505

INVERSE ROTOR

Rudolph A. Matheisel, Tilton, N. H.

Application April 28, 1950, Serial No. 158,777

7 Claims. (Cl. 310—67)

This invention relates to improvements in rotors.

This application is a continuation in part of my Patent No. 2,509,442, issued on May 30, 1950.

Heretofore conventional propellers used for marine and aeronautical propulsion and in fluid current motors, compressors, pumps and turbines do not produce the best possible thrust by the reaction of the slipstream to the propellers so that minimum entrance, slipstream, rotational and viscosity losses are obtained. The best possible thrust and the least loss can be achieved when the thrust and the losses are distributed uniformly over the slipstream section in the rotor which is comprised of a special housing and a rotatable member with various cut acting parts which will hereinafter be described.

The object of my invention is to obtain greater efficiency and the best possible thrust, by eliminating the hub and root sections of the blades and the inherent losses occasioned, by the use of a light rotating device which is encased in a special housing. My structure lends itself better to, and improves the dynamic fluid flow conditions in propulsion, propelling fluids and fluid flow conversion to power and the like.

Another object is to reduce the losses of the dynamic fluid stream and the rotatable member which imparts energy to the stream causing contraction of the sectional area of the stream, or conversely, after the rotatable member abstracts energy from the stream, expansion is caused of the sectional area of the stream. By shaping the structure of the various parts for the dynamic fluid flow conditions is important since the area contraction or expansion losses are reduced to a minimum.

A further object of my invention is to decrease the rotational losses in order to rectify the helical path of the dynamic fluid mass after the rotor imparts or abstracts energy through the blades, at an angle to the general diametric fluid flow direction.

Rectification of the helical flow to axial flow reduces this loss which is found in all rotors, propellers and the like heretofore known.

Still a further object of my invention is to improve the dynamic fluid flow condition at the entrance to the rotor by shaping the structure and the rotatable member so that the "ram effect" due to the forward velocity improves the rotor's efficiency and also inhibits cavitation.

Still another object of my invention is to improve the dynamic flow condition at the entrance of the rotor by the use of guide vanes in order to obtain increased rotor efficiency.

Another object is to reduce the weight of the structure to a maximum by use of a shell and hoops shrunk thereon, wherein the compressive force of the hoop opposes the centrifugal force of the rotating members and permits a greater thrust loading on the blades thereby.

Another object is to eliminate and reduce the cost of expensive external reduction gears and thrust bearings and/or other means of rotation by consolidating these structures with said rotor, particularly where high speed power units are used or where power is derived from fluid currents.

Still another object of the invention is to combine motor and rotor or generator, motor and rotor, or the like with the required rolling and thrust bearings thereby eliminating the unnecessary structural members to obtain compact units.

Another object is to provide greater safety for the public in the use of the various adaptations of my rotor.

For a fuller understanding of the nature and objects of my invention, reference is had to the following detailed description in connection with the accompanying drawings. Preferred embodiments of my invention have been chosen for the purpose of illustration, in which:

Fig. 1 is a longitudinal sectional view of the rotor shown in perspective.

Fig. 2 is an end sectional view of a rotor showing bearings and lubrication means and not showing guide and rectifying vanes in order to clarify the drawing.

Fig. 3 is a partial end section showing an electric motor and rotor combination.

Fig. 4 is a partial end section of a generator, motor and rotor combination in which the armature of the generator and the field of motor as a single unit is gear driven.

Referring to the drawings, Fig. 1 illustrates a faired casing or housing 20 with the faired rotor or annular member 21 fitted therein so that a minimum internal open section area of my invention lies after the section through the median lines of the blades in the direction of flow 34 in order to decrease fluid area contraction losses. To the rotor 21 is fastened pole 45 with armature windings 46 thereon. The number of salient field poles and armature windings peripherally attached to the rotor is four or greater in multiples of two and at equal and opposite spacing. The winding 46 is connected to the peripheral commutator or slip ring 81 which is attached to rotor 21 and separated from the rotor by insulation 60. A brush 82 contacts the commutator 81 and permits electrical current flow to the coil 46 through conductor 83 lying and fastened in channel 27. The brush is attached to the housing and contacts slip ring 81. In order to simplify the drawing of Fig. 1 only one each conductor 83, brush 82, commutator 81 are shown. Two conductors 83 terminate in channel 27 and connect with two or more brushes 82. The brushes are fastened to housing 20 diametrically opposite and contact the separate and insulated slip rings or a single split ring as in a direct current motor. In channel 27 attached to the housing 20 is stationary pole 48 with conductor coil 49 thereon and mating rotating pole 45 and conductor coil 46 on the rotor 21. The number of stationary poles 48 is equal to the number of rotating poles 45. Each end of coil 49 is attached to a conductor not shown, fastened and lying in channel 27 and entering through the hollow strut portion of housing 20. Two such conductors connected to coil 49. The electrical components constitute an electric motor within channel 27 and power means for the rotor 21. The thrust and wearing ring 28 is attached to rotor 21. The annular opening 27 is made fluid tight by means of seals 30. Guide vanes 33 are fixed upon the retaining ring 29 in order to induce the fluid to enter with minimum turbulence and at a predetermined angle to the blades 32. A multiplicity of such blades 32 which are attached or integral with rotor 21, impart energy to the fluid, the said fluid being entrained by the rotating blades tends to travel helically until the rectifying vanes 31 direct the fluid in a truly axial flow, in the direction as indicated by the arrow 34, in order to obtain a minimum loss because of the aforesaid helical travel.

In using direct current, the windings would be adapted to the rotor but the rotating element becomes the rotor of an electric motor in that the windings are applied directly thereto. By this means electric power is applied directly to the rotating element of the rotor without the intervention of gearing or other means of transmission.

My device may be attached to any vessel or vehicle, that is, a propulsion device in order to obtain greater efficiency or may be placed in a dynamic fluid current in order to abstract power from the stream.

Fig. 2 shows a modified structure in which the rotor shell 39 has the blades 40 attached thereto with hoops 41 shrunk thereon. A ball or roller bearing 42 recessed within retainer 43 bears upon a corresponding circumferential recess in the hoop 41. Numeral 44 represents oil or grease which maintains the requisite lubrication for the bearings 42 and retainer 43. The oil or grease 44 is contained within channel 27 in a sealed subportion thereof.

In Fig. 3 I have shown the rotor shell 39 with shrunk hoops 45 thereon, having insulated electrical conductors 46 axially fixed therein, and a non-magnetic, water-proof covering, the whole forming a motor rotor. To the housing 35, poles 48 with insulated conductors 49 formed thereon are attached thereto constituting the stator of the electrical motor which drives the rotor.

In Fig. 4 I have shown the rotor shell 39, with hoop 45, armature conductors 46, non-magnetic, water-proof covering 47, and the motor rotating poles 48, with coils 49 upon shell 53a with electrical armature conductors 54 of the generator recessed in hoops 53 and enclosed with plastic 47 turned on and in bearings through a pinion and ring gears as shown in Fig. 2 of patent application Serial No. 588,869. In a like manner, the shell 39 with the hoop 45 turn on and in bearings also as shown in Fig. 2 herein. The generator field poles 55 carry coils 56 and are fastened to the housing 35. The rotation of the generator-motor field shell 53a and hoops 53 creates the electrical power and is externally regulated for the motor-rotor shell 39 and the hoops 45.

Since the invention resides in the broad idea of applying power to a rotor, and since the selection of the proper type of winding is a matter within ordinary electrical engineering design, the rotor above described has not been illustrated in great detail.

It is obvious that various omissions, various changes and modifications may be made in the details of construction and arrangement of the various parts without departing from the general spirit of the invention as set forth in the appended claims, and I do not desire to limit myself to the exact construction and arrangements illustrated in the drawings and described herein. It will be understood that the invention is not limited to any particular type of rotor, or of windings used thereon, and the type and form of rotor may be selected to suit the particular use to which the rotor is put.

In the device shown in Fig. 1, a D. C. motor, such as a series motor shown in Dawes, Electrical Engineering, vol. I., page 496, or the shunt motor shown on page 502, can be used.

The electrical components may be designed and operated on either alternating current or direct current electricity.

The guide vanes and the rectifying vanes may be omitted in design of a cheaper and less efficient device than that illustrated.

I claim:

1. A streamlined dynamoelectric machine comprising an annular housing having a streamlined outer surface and having an annular channel in its inner surface, an annular rotor having its margins journaled in said channel and its inner surface flush with the inner surface of the housing to form therewith a streamlined throat, the outer surface of the rotor being spaced from the bottom of the channel to provide space for stator and rotor poles separated by the usual air-gap, means in said space for energizing said poles, means for conducting electric current to and from said last named means, a rotor retaining ring coaxial with and forming one end of said housing and having its inner surface forming part of said throat, a wearing ring between the rotor and said retaining ring and having an inner surface flush with and a continuation of the inner surface of the rotor and retaining ring, and impeller blades projecting generally radially inward from the inner surface of the rotor but terminating short of the axis of the rotor whereby to provide a centerless rotor.

2. The device in accordance with claim 1 including guide vanes mounted upon said retaining ring.

3. The device in accordance with claim 1 including guide vanes mounted upon said retaining ring and rectifying vanes angularly mounted upon said housing at that end of the housing opposite the retaining ring.

4. In a streamlined rotor member and housing for same having an inlet and an outlet, a hollow centerless rotor within said housing, said rotor member having blading projecting generally radially inward from the inner surface of said rotor but terminating short of the axis of said rotor, rotor poles attached to the outer surface of said rotor and armature winding, a stator surrounding said rotor within said housing and fixed thereto separately by a gap from said rotor poles, sealing means for said rotor, said sealing means between said housing and said rotor, a slip ring, rigidly supported axially and radially on the exterior surface of said rotor, a streamlined strut attached to said housing, said strut having means therein for carrying current to said slip ring and said rotor poles.

5. The device in accordance with claim 1, including sealing means between said rotor and said housing and said rotor retaining ring and said wearing ring.

6. The device in accordance with claim 1, including means for pressure sealing the annular space between said rotor and said housing.

7. The device in accordance with claim 5, including a hollow streamlined strut fixed to said housing, a stationary pole with conductor coils attached to said housing within said channel, a mating rotating pole with conductor coils attached within said channel to said rotor, a slip ring attached to said rotor within said channel with insulation between said slip ring and said rotor, means within said strut for carrying current to said slip ring and the conductor coils of said rotating pole.

RUDOLPH A. MATHEISEL.

References Cited in the file of this patent

UNITED STATES PATENTS

| Number | Name | Date |
|---|---|---|
| 622,474 | Hoskin | Apr. 4, 1899 |
| 859,368 | Collins | July 9, 1907 |
| 912,144 | Mavor | Feb. 9, 1909 |
| 1,224,933 | Jordan | May 8, 1917 |
| 2,419,159 | Pezzillo | Apr. 15, 1947 |